(12) United States Patent
Kurtz et al.

(10) Patent No.: US 7,987,836 B2
(45) Date of Patent: Aug. 2, 2011

(54) MULTI-COOLER EGR COOLING

(75) Inventors: Eric Matthew Kurtz, Dearborn, MI (US); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 917 days.

(21) Appl. No.: 11/874,696

(22) Filed: Oct. 18, 2007

(65) Prior Publication Data

US 2009/0101122 A1   Apr. 23, 2009

(51) Int. Cl.
*F02B 47/08* (2006.01)
*F02M 25/07* (2006.01)

(52) U.S. Cl. ............... 123/568.12; 123/568.2

(58) Field of Classification Search ........ 123/568.12, 123/568.2, 568.11; 701/108; 60/605.2
See application file for complete search history.

(56) References Cited

U.S. PATENT DOCUMENTS

| | | | |
|---|---|---|---|
| 5,607,010 A * | 3/1997 | Schonfeld et al. | 165/51 |
| 6,918,251 B2 | 7/2005 | Yanagisawa et al. | |
| 6,976,480 B2 | 12/2005 | Miyoshi et al. | |
| 6,978,772 B1 | 12/2005 | Dorn et al. | |
| 7,059,308 B2 * | 6/2006 | Eitel et al. | 123/568.12 |
| 7,299,793 B1 * | 11/2007 | Tyo et al. | 123/568.12 |
| 2005/0188965 A1 | 9/2005 | Usui | |
| 2006/0200297 A1 * | 9/2006 | Liu et al. | 701/104 |
| 2007/0204619 A1 * | 9/2007 | Pelz et al. | 60/605.2 |

FOREIGN PATENT DOCUMENTS

| | | |
|---|---|---|
| EP | 1170498 A1 * | 1/2002 |
| EP | 1420159 | 5/2004 |
| EP | 1464823 | 10/2004 |
| FR | 2876417 | 4/2006 |
| WO | 2005095780 | 10/2005 |
| WO | 2005116437 | 12/2005 |
| WO | 2006/096346 | 9/2006 |

OTHER PUBLICATIONS

ISA United Kingdom Intellectual Property Office, International Search Report of GB0817483.1, Jan. 19, 2009, 1 page.

* cited by examiner

*Primary Examiner* — Mahmoud Gimie
(74) *Attorney, Agent, or Firm* — Julia Voutyras; Alleman Hall McCoy Russell & Tuttle LLP (57) ABSTRACT

A system is described for coordination of Exhaust Gas Recirculation (EGR) flow through and around a plurality of EGR coolers differently depending on operating conditions.

18 Claims, 6 Drawing Sheets

FIG. 3D $$\dot{m}_1 = \dot{m}_{C.1} + \dot{m}_{BP.1}$$

$$\dot{m}_2 = \dot{m}_{C.2} + \dot{m}_{BP.2}$$

$$\dot{m}_{EGR} = \dot{m}_1 + \dot{m}_2$$

MULTI-COOLER EGR COOLING

BACKGROUND AND SUMMARY

Engines may utilize EGR to reduce emissions and increase efficiency. For example, diesel engines may use EGR to address NOx generation during combustion. When the engine operates with boosting, such as via a turbocharger, the engine output may be limited based on the temperature of intake air. As such, hot EGR may reduce available engine output, as it heats the incoming fresh charge.

As such, in some systems, an EGR cooler, or a plurality of EGR coolers, may be used. For example, a plurality of EGR coolers in series may be used, where the coolers are configured differently to provide different amounts of cooling. Such a system is described in WO2005095780.

However, the inventors herein have recognized several issues with the above approach, and other approaches. In particular, while such configurations may enable multi-stage cooling, they may also lead to cooler fouling (overcooling and condensation) under some conditions. While such fouling may be avoided by reducing EGR flow, this then may result in increased emissions.

The above issues may be addressed, at least partially, by a system that coordinates EGR flow through and around a plurality of coolers differently depending on operating conditions. Thus, the inventors herein have recognized that, depending on operating conditions, EGR flow may be modulated through separate/different pathways to achieve an intake temperature (and/or EGR flow, EGR flow temperature, etc.) while also avoid individual cooler fouling conditions.

Further, the inventors herein have recognized an approach to address a constraint often experienced in EGR system design. In particular, EGR coolers may be designed for the high cooling load point. Then, under lighter loads, because over-cooling may occur, EGR bypass may be used. However, under some load conditions, the amount of bypass desired to avoid EGR fouling may lead to too much bypass, thus leading to intake manifold temperatures becoming too high for desired combustion characteristics or for system durability.

By appropriate modulation of EGR flow through a plurality of coolers and at least one bypass in a variety of modes, it is possible to both maintain cooler outlet temperatures above fouling limits, and also maintain intake manifold temperature at an appropriate level for combustion. The modes may be selected based on engine speed and load conditions, based on feedback including estimates of intake and EGR temperatures, and/or combinations thereof. Further, adjustment of flows within the various cooling modes may also be used based on operating conditions such as intake manifold temperature, and others.

Thus, rather than designing EGR cooling systems for the highest cooling load point (which may result in an oversized cooler for other operating conditions), the system can modulate the cooling capacity and partial bypass flow to use only part of that cooling capacity to target a higher intake temperature. The higher intake temperature can then lead to reduced CO and HC emissions.

Note that while different amounts of partial EGR cooler bypass operation may be used, the system may also operate between either full or no cooler bypass operation, with various modes in which different coolers utilize different settings.

BRIEF DESCRIPTION OF THE DRAWINGS

FIGS. 3 A-D show various operating modes of the configuration shown in FIG. 2

FIGS. 5 A-D show various operating modes of the configuration shown in FIG. 4

DETAILED DESCRIPTION

Figure 1:
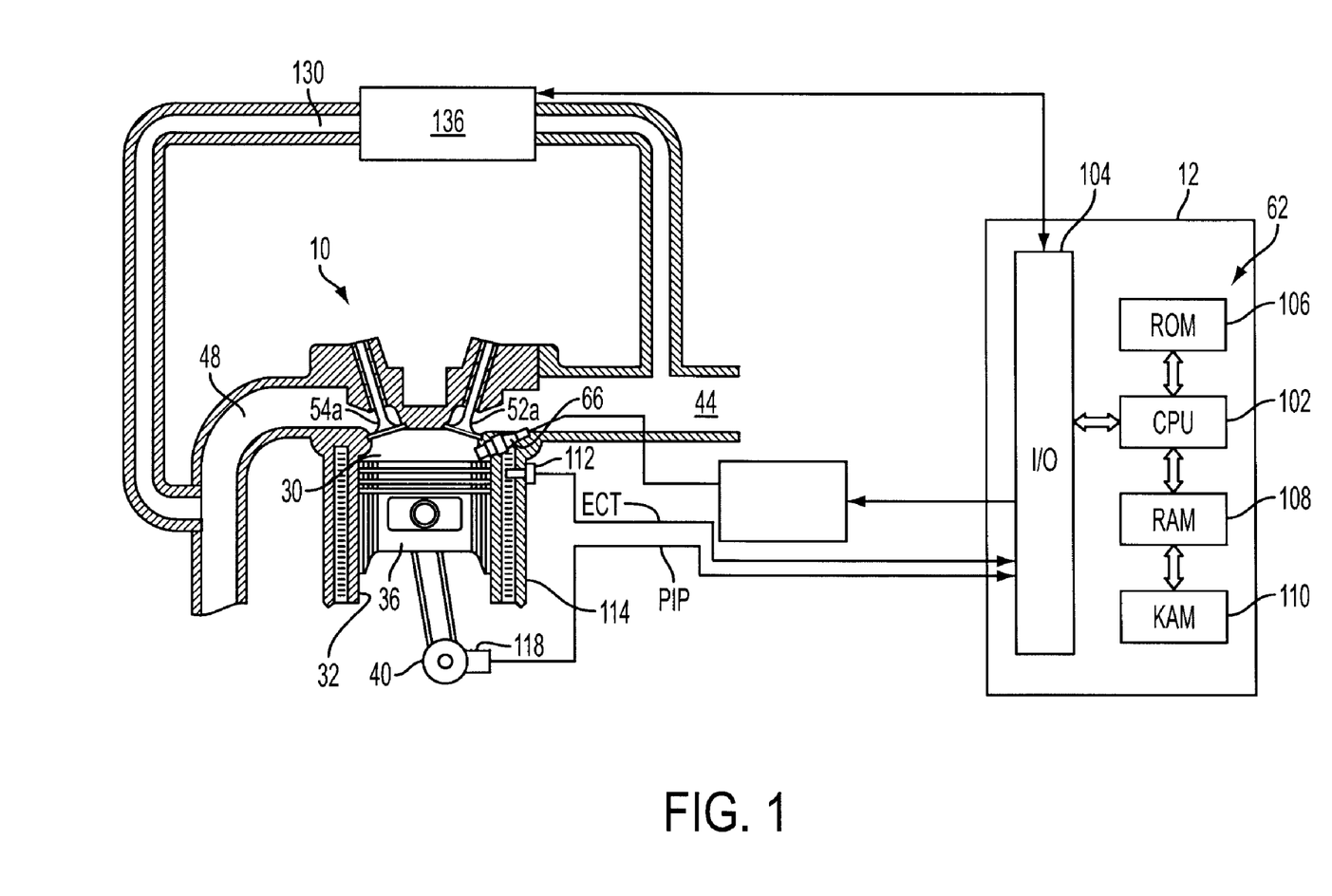
FIG. 1 shows an example and Exhaust Gas Recirculation (EGR) system.

Referring now to FIG. 1, direct injection internal combustion engine 10, comprising a plurality of combustion chambers and controlled by electronic engine controller 12 is shown. Combustion chamber 30 of engine 10 includes combustion chamber walls 32 with piston 36 positioned therein and connected to crankshaft 40. Combustion chamber 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein. Injector 66 is coupled to a high pressure diesel fuel injection system 70, for example, such as a common rail system. The fuel system 70, including injector 66, may be controlled via the controller 12.

In some embodiments, engine 10 may include a plurality of combustion chambers each having a plurality of intake and/or exhaust valves. FIG. 1 is just one example of an internal combustion engine.

Further, exhaust gas recirculation (EGR) path 130 is shown communicating with exhaust manifold 48 and intake manifold 44, the path including an EGR system 136. As described in further with regard to FIGS. 2-6, the EGR system may include a plurality of valves, coolers, and bypasses, which may be adjusted via controller 12. In one example, a plurality of coolers (e.g., two, three, etc.) connected in series, in parallel, and/or combinations thereof, may be used. The EGR system may include high pressure EGR (where EGR is directed from the exhaust system from upstream of a turbine of a turbocharger to the intake system downstream of a compressor of the turbocharger). Additionally, or alternatively, the EGR system may include low pressure EGR (where EGR is directed from the exhaust system from downstream of the turbine to the intake system upstream of the compressor).

As noted above, when using coolers to cool EGR in order to improve engine efficiency and operation when boosting, cooler fouling may occur. For example, if the EGR is cooled below a fouling temperature (which may vary with operating conditions, such as humidity, EGR air-fuel ratio, etc.), degraded performance may occur. Additionally, when adjusting EGR cooler bypass to avoid fouling, intake manifold temperature may rise above a desired level for desired combustion. While fouling temperature may be used to identify fouling conditions, various other factors may also be considered. For example, other parameters can influence fouling, such as cooler flow rate, velocity, Reynolds number, or combination of these parameters with temperature. As such, these parameters or combinations thereof may also be used as thresholds to identify fouling and trigger operation in response thereto as described herein.

One approach to address the fouling, while still providing sufficient EGR for engine operating conditions and still providing an appropriate intake charge temperature, is to control each cooler outlet temperature (T_OUTLET_j) of each of a plurality of coolers to be greater than fouling temperature, at least under some conditions, while also adjusting EGR cooler and/or bypass operation based on intake manifold temperature. For example, the system may operate in various operating modes, including providing maximum (unrestricted) flow through each of a first and second cooler to provide maximum cooling when needed. During such operation, the system can monitor intake manifold temperature, and if intake temperature falls too low, the system can increase EGR bypassing that cooler. However, such operation may increase a likelihood of fouling, and thus the bypassing can be adjusted and increased/decreased, if necessary to control outlet temperature, up to full cooler bypass if a cooler outlet temperature approaches a fouling temperature to reduce cooling capacity and reduce fouling concerns while enabling higher intake temperatures. Thus, the bypass may be used to increase intake temperature until a fouling criteria is met. At that time, one cooler may be fully bypassed to reduce cooling capacity and increase intake temperature while reducing fouling concerns. Further, if another cooler outlet temperature approaches a fouling condition, the system can increase EGR bypassing the other cooler, again until it is totally bypassed. Again, a similar process may be used with the second cooler, where the bypass is increased to increase temperature until a fouling criteria is met. At that time, the other cooler may be fully bypassed to further reduce cooling capacity and increase intake temperature while reducing fouling risk. Concurrently, the cooler flow and/or bypass operation can be adjusted to maintain intake manifold temperature below a threshold value for the current engine operating conditions. Thus, throughout such operation, the system can adjust the bypassing EGR flow and flow through the coolers to both avoid fouling, while still providing the desired EGR and intake charge temperature for combustion. In another example, the system may primarily adjust EGR cooler flow and bypass flows responsive to intake manifold temperature while also monitoring for and compensating for fouling situations as they occur. Various examples of operation are described further with regard to FIGS. 2-7.

While not shown in FIG. 1, the engine may communicate with various intake system devices, such as a throttle plate, turbocharger, etc. Further, the engine may also communicate with various exhaust system devices, such as an SCR catalyst, oxidation catalyst, turbocharger, air-fuel ratio sensor, particulate filter, and/or others.

Controller 12 is shown in FIG. 1 as a microcomputer including: microprocessor unit 102, input/output ports 104, an electronic storage medium of executing programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from a mass air flow sensor coupled in the intake, engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position from a throttle position sensor; and absolute manifold pressure in the intake manifold.

As will be described in more detail below, combustion in engine 10 can be of various types, depending on operating conditions. In some embodiments, engine 10 can operate in a diesel mode where fuel is combusted upon injection into the combustion chamber. In some embodiments, engine 10 can also operate in a homogeneous charge compression ignition (HCCI) mode or a partially homogeneous charge compression ignition (PHCCI) mode.

Figure 2:
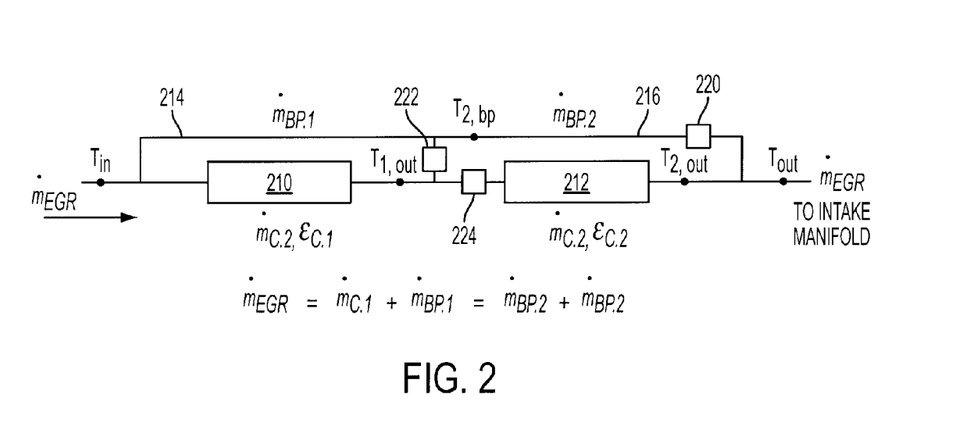
FIG. 2 shows additional details of a series configuration EGR system with coolers.

Referring now to FIG. 2, an example EGR system is illustrated having a first and second EGR cooler arranged with cooler 210 located upstream of cooler 212, and having an upstream bypass 214 and a downstream bypass 216. Further, valves 222, 224, and 220 may provide various actions, including controlling EGR flow into the intake manifold ($m_{EGR}$), relative EGR flow among the upstream and downstream bypasses and/or coolers. For example, coordinated control among the valves may control EGR flow, EGR temperature, intake manifold temperature, or others to desired valves, where the desired valves may be adjusted based on engine operating conditions such as fuel injection amount, engine speed, engine load, etc. The coolers may be of equal size and/or cooling capacity, or one cooler may have a greater size and/or cooling effect than the other. Further, both coolers may use substantially the same coolant temperature difference, or the coolers may use separate coolant with different temperatures. For example, the upstream cooler may operate with coolant at a higher temperature and/or pressure than the downstream cooler. Further, the coolant loops may be separate, with different radiator sections, and may be maintained separate through the cooling system.

The valves are shown in an example configuration. The valves may be proportional valves actuated via electromechanics, vacuum, hydraulics, or combinations thereof. Further, valve 224 could be either before or after cooler 212, but before cooled flow is mixed with the bypass flow after cooler 212. Additionally, valve 220 could be at various locations in the bypass line from the inlet near Tin to the outlet near Tout.

FIG. 2 illustrates the different temperatures at different locations (e.g., Tin, T1,out, T2,out, T2,bp, Tout), different flows through the coolers and bypasses (e.g., mC,1, mC,2, mBP,1, mBP,2), and different cooler effectiveness/efficiency (e.g., $\epsilon C,1$, $\epsilon C,2$).

As noted herein, if EGR is cooled to a temperature at or below a given temperature, fouling may result. (e.g., T1,out>Tfouling). In the embodiment of FIG. 2, the respective outlet temperature of the upstream and downstream coolers may be maintained above the fouling temperature via coordination of valves 220, 222, and 224, while still providing a desired EGR flow and/or maintaining a selected intake manifold temperature. This may be achieved via progressive adjustment of EGR cooling and bypassing as more or less cooling is used to maintain the respective cooler outlet temperatures above the fouling temperature.

Figure 3A:
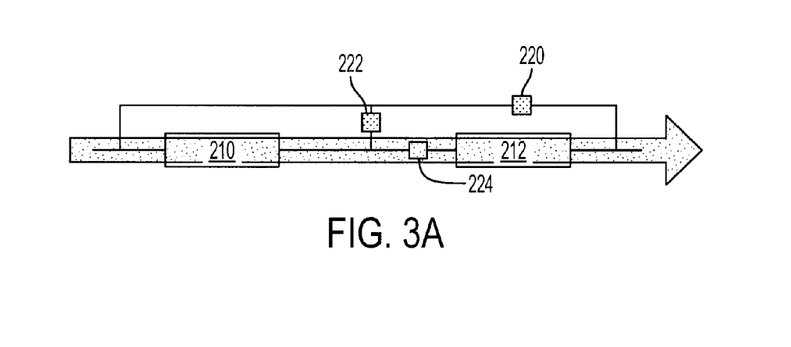

For example, as described in FIG. 3A, the valves may be operated and configured in various modes based on cooler outlet temperatures. Specifically, mode 310 illustrates that valve 220 is closed, and valve 222 is also closed. As a result, mBP,1=mBP,2=0; and mC,1=mC,2=mEGR. Coolers 210 and 212 have maximum flow through (with valve 224 fully open), and therefore, each outlet temperature (T1,out and T2,out) is maximized. Further, Tout would be at its minimum value for a given EGR flow. EGR flow may be adjusted by adjusting valve 224.

Figure 3B:
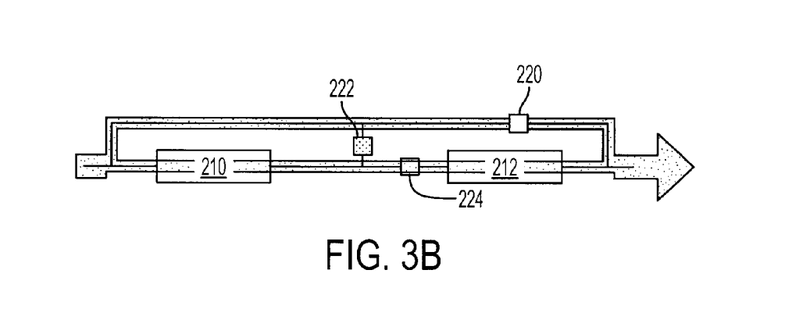

When operating in the mode shown in FIG. 3A and the temperature Tout approaches the fouling temperature and/or intake manifold temperature falls below a target temperature, the EGR system may transition to the mode shown in FIG. 3B. Specifically, FIG. 3B shows how Tout may be increased as compared to the mode of FIG. 3A by partially bypassing the downstream cooler while maintaining EGR flow. As shown valve 222 remains closed, with both vales 220 and 224 opened, where the amount of opening of valves 220 and 224 is adjusted based on operating conditions to maintain desired EGR flow and outlet temperature above the fouling temperature. Therefore, mBP,1=mBP,2, which increases; and mC,1=mC,2, which decreases. Further, flow through coolers 210 and 212 decreases and thus cooler effectiveness increases and T2out decreases; however, when mixed with the uncooled EGR, this increases Tout.

In one example, control of valves 224 and 220 are coordinated to achieve flow and temperature where valve 224 is adjusted in response to desired EGR flow, and valve 220 is adjusted (differently) in response to temperature, or vice versa.

The system can continue operating in the mode of FIG. 3B while T2,out remains above Tfouling. Further, in an alternative approach, if T2,out rises significantly above Tfouling, the system can return to the mode of FIG. 3A. However, if the temperature T2,out drops to Tfouling, the system may transition to the operating mode of FIG. 3C described below. The system may model the temperature out of the bypassed cooler assuming that the cooler was active to make such an assessment, in one example.

Figure 3C:
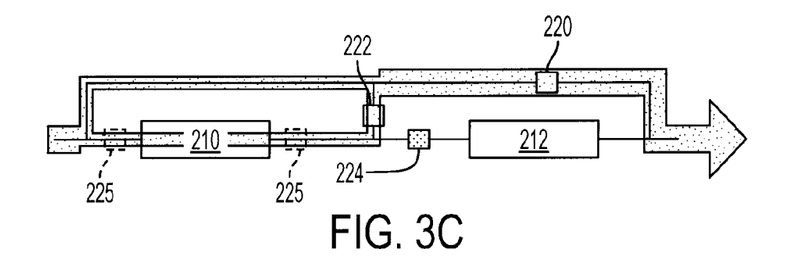

Specifically, FIG. 3C shows how T1,out and/or T2,out may be increased (or at least not allowed to fall below the fouling temperature) as compared to the mode of FIG. 3B by fully bypassing the downstream cooler while maintaining EGR flow and maintaining T1,out at or above Tfouling (note that if a cooler is fully bypassed, its outlet temperature may not be considered in this situation). Valve 224 is fully closed, and valves 222 and 220 are controlled based on operating conditions to provide desired EGR flow and outlet temperature of cooler 210. As a result, and compared to the mode of FIG. 3B, mC,1 increases and mBP,1 decreases, and may even be zero (valve may be closed), and flow through cooler 210 increases to increase T1,out. In this way, by avoiding the downstream cooler, the EGR can be cooled to a temperature below that of the mode of FIG. 3B, when T2,out is at or near the fouling temperature, at least under some conditions. Another potential results is that the system can achieve a higher intake temp than in FIG. 3B without exceeding the fouling criteria (T1, out>Tfouling).

Again, valves 222 and 220 are coordinated to achieve flow and temperature where valve 222 is adjusted in response to desired EGR flow, and valve 220 is adjusted (differently) in response to temperature, or vice versa.

The system can continue operating in the mode of FIG. 3C while Tout remains above Tfouling. Further, in an alternative approach, if Tout rises significantly above Tfouling, the system can return to the mode of FIG. 3B, and/or 3A. However, if the temperature Tout drops to Tfouling, the system may transition to the operating mode of FIG. 3D described below. The system may model the temperature out of the bypassed cooler assuming that the cooler was active to make such an assessment, in one example.

As still another alternative, an additional valve (225) can be placed before or after cooler 210 as shown by the dashed line in FIG. 3C. In this configuration, the system can fully bypass either cooler 210 or cooler 212, where a selection of which cooler to bypass may be based on various operating conditions and in consideration of different cooling capacities of coolers 210 and 212. The different cooling capacities may be due to different cooling temperatures and/or sizes between the coolers 210 and 212, for example.

Figure 3D:
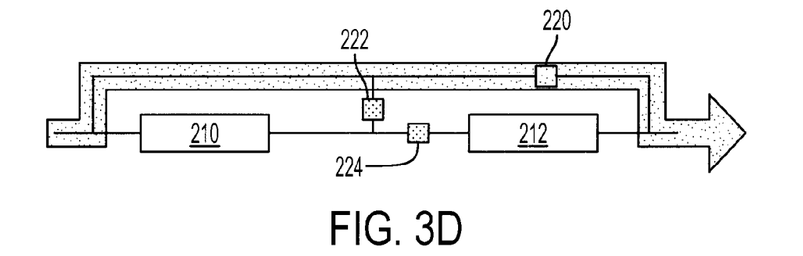

Specifically, FIG. 3D shows how Tout may be increased (or at least not allowed to fall below the fouling temperature) as compared to the mode of FIG. 3C by fully bypassing both the upstream and the downstream coolers while maintaining EGR flow. Valves 222 and 224 are both fully closed, and valve 220 is controlled based on operating conditions to provide desired EGR flow. As a result, and compared to the mode of FIG. 3C, mC,1=mC,2=0; mBP,1=mBP,2=mEGR, and Tout would be at its maximum value for a given EGR flow. In this way, by avoiding both coolers, EGR cooling is further reduced to address fouling.

Note that the various valve modes above utilize different valve operation of the EGR valves to achieve EGR flow and temperature control, resulting in different amounts and locations of EGR cooling. For example, a first operation can utilize cooling of both EGR coolers, and then via different valve adjustment, cooling of only one EGR cooler may be used. In this way, fouling of both EGR coolers can be reduced for various operation conditions by varying which cooler provides cooling, and how much cooling is provided, in coordination with maintaining desired EGR flow and/or intake charge temperature.

Also, in an alternative embodiment, an additional valve may be placed in the system, so that a first and second bypass valve is used, one for each of bypasses 214 and 216. Such a configuration may enable=an additional possibility to bypass either cooler 210 or cooler 212 separately, which may provide additional flexibility, such as in a configuration when the coolers have differing cooling capacity. For example, an additional mode may be used in which cooler 210 is fully bypassed and EGR flow flows through cooler 212 and the second bypass 216.

Note that operation among and selection of the various modes may be controlled by controller 12 in a feed-forward manner based on mapping tables, such as based on engine speed/load. Additionally, or alternatively, the controller may utilize temperature models to estimate EGR cooler and bypass temperatures, as well as predict such temperatures should a transition in modes be performed. In this way, the control system may adaptively adjust selection of modes, and operation within the modes, to provide the desired EGR cooling, bypass operation, and intake manifold temperature control.

Figure 4:
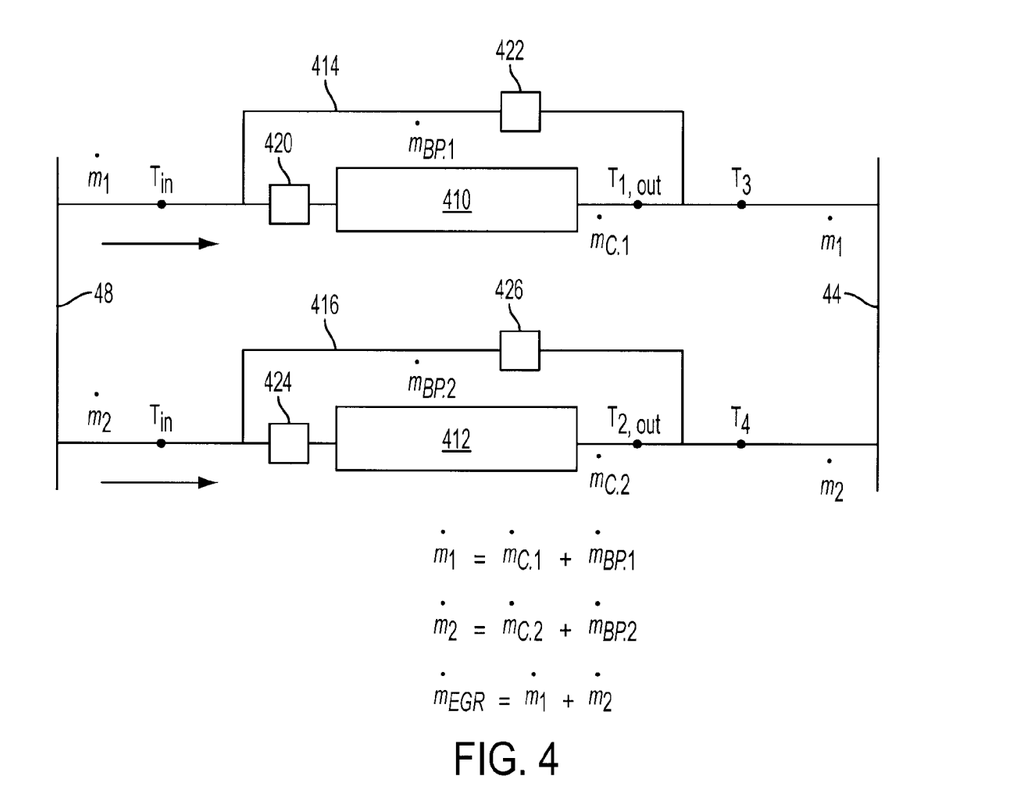
FIG. 4 shows additional details of a parallel configuration EGR system with coolers.

Referring now to FIG. 4, still another alternative embodiment EGR system is described, where a first and second cooler 410, 412 are arranged in a parallel configuration, having respective bypasses 414 and 416, and respective valves 422422 and 426426, and 420420 and 424424. Valves 420, 422, 424, and 426 may provide various actions, including controlling EGR flow into the intake manifold ($m_{EGR}$), relative EGR flow among the upstream and downstream bypasses and/or coolers. For example, coordinated control among the valves may control EGR flow, EGR temperature, intake manifold temperature, or others to desired valves, where the desired valves may be adjusted based on engine operating conditions such as fuel injection amount, engine speed, engine load, etc. The coolers may be of equal size and/or cooling capacity, or one cooler may have a greater size and/or cooling effect than the other. Further, both coolers may use substantially the same coolant temperature difference, or the coolers may use separate coolant with different temperatures. Also, while two coolers and bypasses are shown, the system may include three, four, or more.

The valves are shown in an example configuration. The valves may be proportional valves actuated via electromechanics, vacuum, hydraulics, or combinations thereof. Further, the valves may be placed at various positions in the passages shown, or various valves may be combined. For example, valves 420 and 424 may be located downstream of the respective coolers.

FIG. 4 also illustrates the different temperatures at different locations (e.g., Tin, T1,out, T2,out, T3, T4), and different flows through the coolers and bypasses (e.g., mC,1, mC,2, mBP,1, mBP,2).

As noted herein, if EGR is cooled to a temperature at or below a given temperature, fouling may result. (e.g., T1,out>Tfouling). In the embodiment of FIG. 4, the respective outlet temperature of the coolers may be maintained above the fouling temperature via coordination of valves 422, 426, 420, and 424, while still providing a desired EGR flow and/or maintaining a selected intake manifold temperature. This may be achieved via progressive adjustment of EGR cooling and bypassing as more or less cooling is used to maintain the respective cooler outlet temperatures above the fouling temperature.

Note that in an example alternative embodiment, a single bypass may be used (e.g., 414), and the second bypass (e.g., 416) may be eliminated.

Figure 5A:
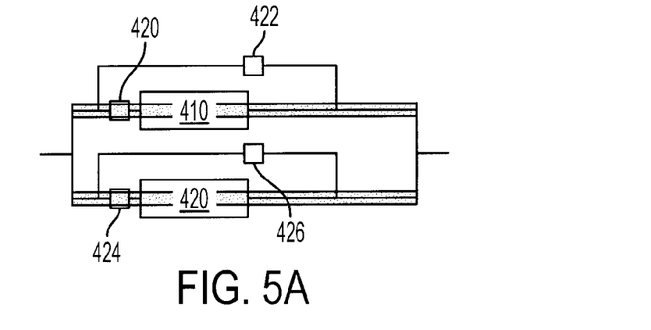

For example, as described in FIG. 5A, the valves may be operated and configured in various modes based on cooler outlet temperatures. Specifically, mode 510 illustrates full flow through EGR coolers 410 and 412 where valves 422 and 426 are fully closed, and valves 420 and 424 are open and used to control EGR flow. As such, mBP,1=mBP,2=0, and mC,1+mC,2=mEGR (where the flow through each cooler may or may not be equal, and may vary to be greater or lesser). Coolers 410 and 412 may experience maximum flow through, and therefore, their outlet temps (T1,out and T2,out) may be increased (where the outlet temperatures may or may not be equal). Further, Tout would be at a reduced value for a given EGR flow. Under some conditions, the amount of flow between the two cooling paths may be adjusted to vary intake temperature. In this case, the cooler outlet temperatures may not be at maximum vales for both coolers since due to the differential cooler operation. For example, full flow through one cooler could produce the maximum outlet temperature of a given cooler, while the other cooler operates with an outlet temperature below its maximum potential value.

Figure 5B:
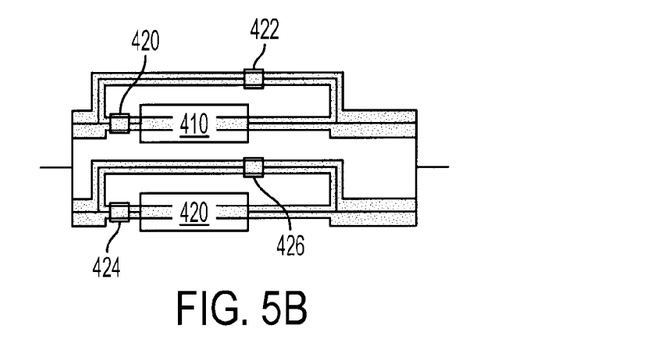

When operating in the mode shown in FIG. 5A and the temperature Tout approaches the fouling temperature and/or intake manifold temperature falls below a threshold temperature, the EGR system may transition to the mode shown in FIG. 5B. Specifically, FIG. 5B shows how Tout may be increased as compared to the mode of FIG. 5A by partially bypassing coolers 410 and 412 while maintaining EGR flow and maintaining T2,out at or above Tfouling. As shown, valves 422 and 426 are opened, and valves 420 and 424 are open, where the respective opening amounts may be individually adjusted based on operating conditions to maintain a desired EGR flow, temperature, etc. As a result, mBP,1 & mBP,2 increases; and mC,1 & mC,2 decreases. Further, flow through coolers 410 and 412 decreases, and cooler effectiveness increases, thus decreasing T1,out and T2,out.

In one example, control of the valves may be coordinated to achieve flow and temperature where valves 420 and 424 are adjusted in response to desired EGR flow, and valves 422 and 426 are adjusted (differently) in response to temperature, or vice versa.

The system can continue operating in the mode of FIG. 5B while T2,out remains above Tfouling. Further, in an alternative approach, if T2,out rises significantly above Tfouling, the system can return to the mode of FIG. 5A. However, if the temperature T2,out drops to Tfouling, the system may transition to the operating mode of FIG. 5C described below.

Figure 5C:
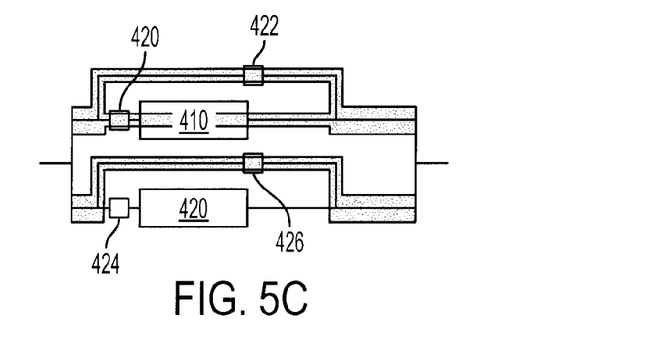

Specifically, FIG. 5C shows how T1,out may be increased (or at least not allowed to fall below the fouling temperature) while maintaining T2,out<Tfouling by shutting off flow through one cooler (and maintaining desired EGR flow). For example, flow through cooler 412 may be fully shut-off, or alternatively, cooler 410 may be fully shut-off. In the first example, valve 424 is closed, valve 420 is open and controlled, and valves 422 and 426 may be adjusted (open or closed). As a result, mC,2=0; mC,1 increases (compared to before a transition into the mode of FIG. 5C from the mode of FIG. 5B); and mBP,1+mBP,2 decreases (and may even close). The flow through cooler 410 thereby increases to increase T1,out, and the flow through cooler 410 may be set such that Tout<=Tout from the mode of FIG. 4B when T2,out=Tfouling.

The system can continue operating in the mode of FIG. 5C while T1,out remains above Tfouling. Further, in an alternative approach, if T2,out rises significantly above Tfouling, the system can return to the mode of FIG. 5B, and/or 5A. If a higher Tout temperature is desired, the system may increase Tout by bypassing cooler 410 (maintaining EGR flow) until T1,out=Tfouling, where valve 424 is still closed, and valves 422 and 426 are opened further and controlled, and valve 420 is opened and controlled. Here, mC,2=0; mBP,1+mBP,2 increases; and mC,1 decreases. Thus, flow through cooler 410 drops—cooler effectiveness increases—and T1,out decreases. The system may continue to operate in this mode until T1,out drops to Tfouling, whereby the system may transition to the operating mode of FIG. 4D described below.

Figure 5D:
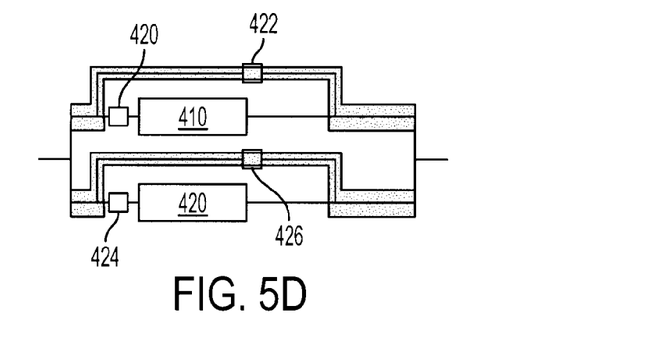

Specifically, FIG. 5D shows how T,out may be increased (or at least not allowed to fall below the fouling temperature) by shutting off flow through coolers 410 and 412. In this example, valve 424 is still closed, valve 420 is closed, and valves 422 and 426 are open and controlled to control the EGR flow rate, for example. As such, mC,1=mC,2=0; mBP, 1+mBP,2=mEGR, and Tout would be at its maximum value for a given EGR flow.

Figure 6:
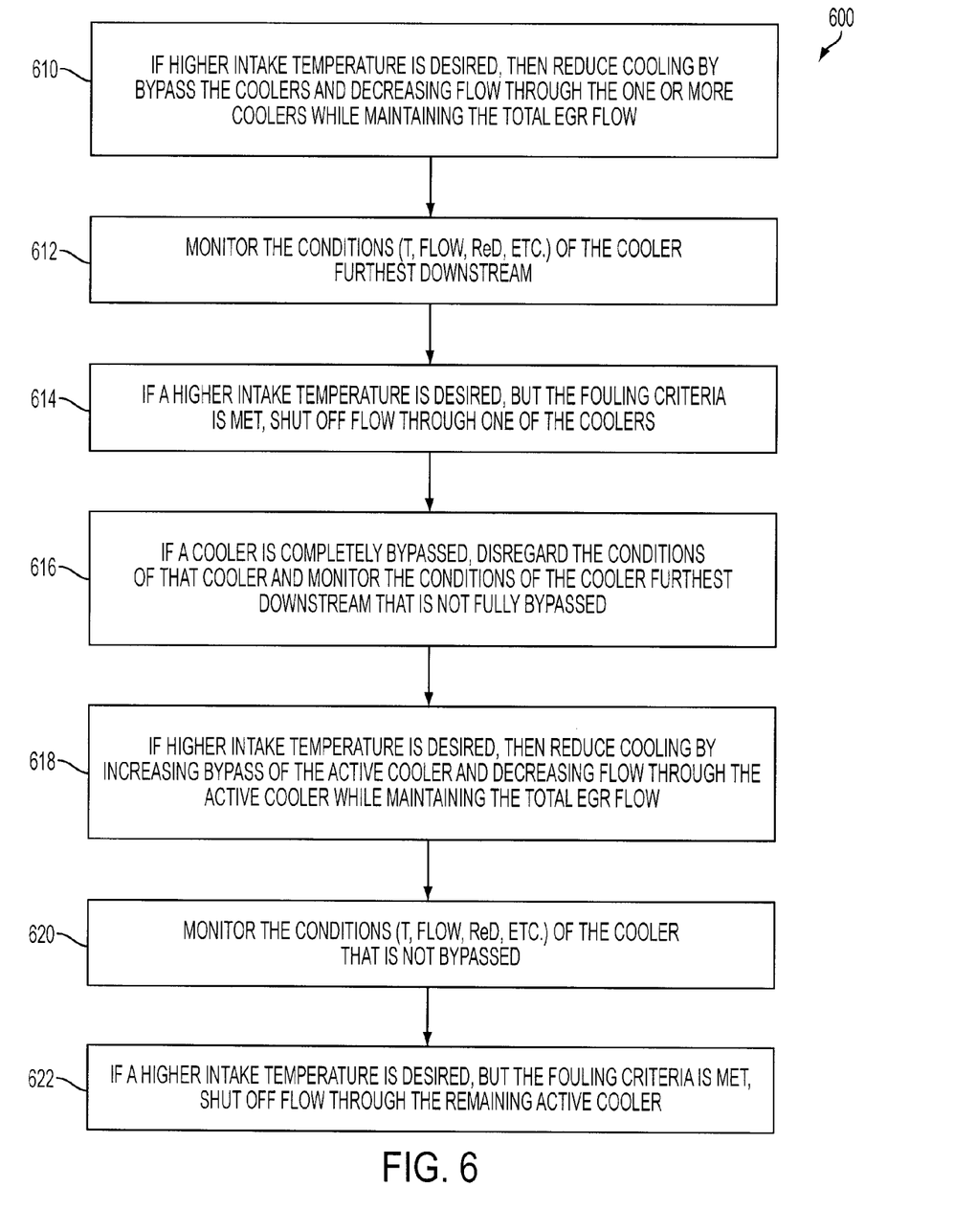
FIGS. 6-7 show high level flowcharts of example operation.

Referring now to FIG. 6, an example operation of the system of FIG. 2 is illustrated via the flow chart 600. The flow chart shows operation with progressively less cooling via different cooler modes. Note that the particular cooling mode used may vary with operating conditions, and not necessarily in the order shown in FIG. 6.

In 610, the routine determine If higher intake temperature is desired, and if so reduces cooling by bypassing a plurality of coolers (e.g., a first and second) and decreasing flow through the plurality of coolers while maintaining the total desired EGR flow. Next, in 612, the routine monitors the conditions (e.g., temperature, flowrate, Reynolds number, etc.) of the cooler furthest downstream (or each cooler if in parallel). Then, at 614, if a higher intake temperature is desired (e.g., due engine operating conditions), but the fouling criteria is met, the routine shuts off flow through one of the coolers.

Continuing with FIG. 6, at 616, if a cooler is completely bypassed, the routine disregards the conditions of that cooler and monitors the conditions of the cooler furthest downstream that is not fully bypassed. At 618, the routine determines if higher intake temperature is desired, and if so reduces cooling by increasing bypass of the active cooler and decreasing flow through the active cooler while maintaining the total EGR flow.

At 618, the routine monitors the conditions (e.g., temperature, flowrate, Reynolds number, etc.) of the cooler that is not bypassed. At 620, the routine determines if a higher intake temperature is desired, but the fouling criteria is met, and if so shuts off flow through the remaining active cooler.

In this way, operation is provided that can provide progressively more cool or less cooling, and thereby maintain EGR flow while keeping flow exiting the coolers above the fouling temperature. Note also that the order may be changed, and in particular may be adjusted based on differing capacities of upstream and downstream coolers. For example, if the coolers have different capacities, the system may first bypass the upstream cooler, and then bypass downstream cooler, to provide progressively less cooling. Further, similar operation can be provided via the parallel system configuration of FIG. 4. Thus, the system may, under a first mode, bypass a first cooler, before bypassing a second cooler, and under a second mode, bypass the second cooler, before bypassing the first cooler.

Figure 7:
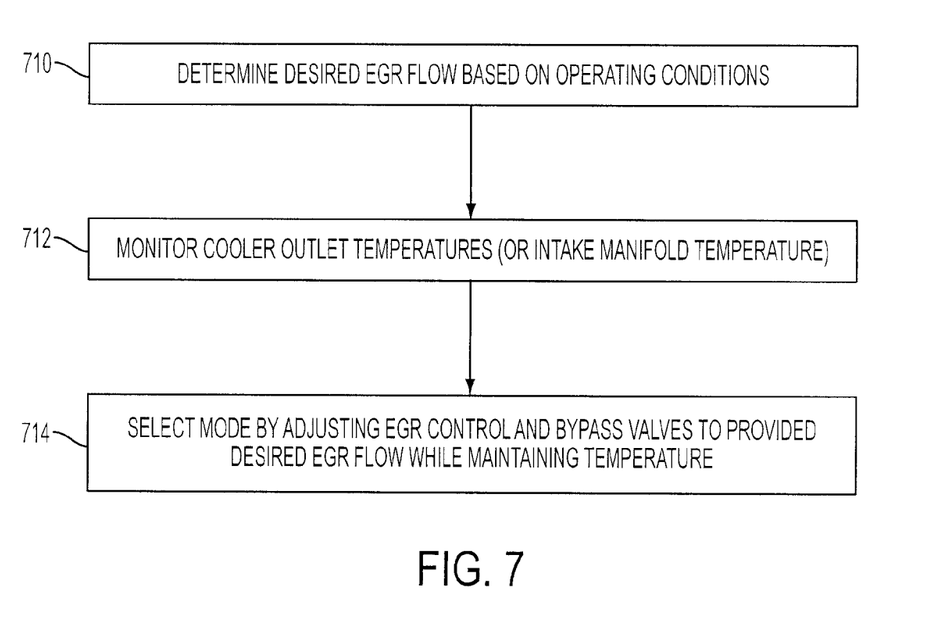

Referring now to FIG. 7, a high level flowchart for selection of cooler operating modes is provided. First, in 710, the routine determines a desired EGR flow based on operating conditions, such as engine load, fuel injection amount, coolant temperature, etc. Note that the routine may alternatively target an air mass flow, EGR rate, burnt gas fraction, or intake oxygen concentration or temperature set point rather than EGR mass flow.

Then, in 712, the routine monitors cooler outlet temperature(s) and/or intake manifold temperature to indicate whether a potential for fouling is present or whether intake manifold temperature has fallen below a lower threshold or risen above a higher threshold. Then, in 714, the routine selects an EGR cooler mode based on the information from 710 and 712, as well as based on other operating conditions. For example, the system may select an operating mode based on the cooling capacity differences of different coolers.

Such control may be implemented in a variety of different ways including closed loop, open loop, and a combination of the two. For example, the routine may control an intake manifold temperature or EGR gas outlet temp in closed loop via proportional EGR control while avoiding fouling due to condensation to allow intake manifold temperature or cooler gas outlet temp control. Further, the control may be adjusted to enable mode selection based on vehicle driving conditions, ambient conditions, engine cooling system capabilities, etc.

It will be appreciated that the configurations disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for delivering exhaust gas recirculation (EGR) through a recirculation system to an engine intake manifold, comprising:
a first EGR cooler coupled in the recirculation system;
a first EGR cooler bypass that bypasses at least the first EGR cooler;
a second EGR cooler coupled in the recirculation system;
a second EGR cooler bypass that bypasses the second EGR cooler;
a plurality of valve elements; and
a controller including non-transitory electronic storage medium with programs to adjust the plurality of valve elements to adjust an amount and temperature of EGR delivered to the intake manifold, the valve elements further adjusted in response to a first outlet temperature of the first EGR cooler to adjust bypassing of the first and second EGR coolers differently based on whether any of said first outlet temperature and a second outlet temperature of the second EGR cooler approaches a fouling temperature, wherein the first outlet temperature is a temperature of gases at an outlet of the first EGR cooler but upstream of a point where bypass gases are introduced from the first EGR cooler bypass, and wherein the second outlet temperature is a temperature of gases at an outlet of the second EGR cooler but upstream of a point where bypass gases are introduced from the second EGR cooler bypass.

2. The system of claim 1 where the first EGR cooler is coupled upstream of the second EGR cooler.

3. The system of claim 1 wherein the first EGR cooler is coupled in parallel with the second EGR cooler.

4. The system of claim 1, where the controller further adjusts the plurality of valve elements to bypass the first EGR cooler before bypassing the second EGR cooler, the valve elements further adjusted in response to the first outlet temperature of the first EGR cooler and the second outlet temperature of the second EGR cooler to adjust bypassing of the first and second EGR coolers.

5. The system of claim 1 where the controller further adjusts the plurality of valve elements to adjust an amount of bypassing EGR flow while still maintaining a total EGR flow at a desired value, where at least one valve is moved to a preset position based on engine operating conditions, and a second valve is adjusted responsive to EGR flow and temperature.

6. The system of claim 4 where the controller operates the system in a first mode where an amount of bypassing EGR of the first EGR cooler is varied without varying an amount of bypassing EGR of the second EGR cooler, and in a second mode where the amount of bypassing EGR of the second EGR cooler is varied without varying the amount of bypassing EGR of the first EGR cooler, and where the controller further adjusts the plurality of valve elements in response to EGR flow rate and/or a Reynolds number of the EGR flow, and where the first and second EGR coolers have different cooling capacities, and where the controller selects a mode based on the cooling capacities.

7. The system of claim 4 where the controller operates the system in a first mode where the first cooler is bypassed and the second cooler is not bypassed, a second mode where the first cooler is not bypassed and the second cooler is bypassed, a third mode with both the first and second coolers bypassed, and a fourth mode with both the first and second coolers not bypassed.

8. A system for delivering exhaust gas recirculation (EGR) through a recirculation system to an engine intake manifold, comprising:
a first EGR cooler coupled in the recirculation system;
a first EGR cooler bypass that bypasses the first EGR cooler;
a second EGR cooler coupled in the recirculation system;
a second EGR cooler bypass that bypasses the second EGR cooler, the first EGR cooler coupled upstream of the second EGR cooler, and the first EGR cooler bypass coupled upstream of the second EGR cooler bypass;
a plurality of valve elements; and
a controller including non-transitory electronic storage medium with programs to adjust the plurality of valve elements to operate the system in a first mode where EGR is cooled only with the first cooler, a second mode where EGR is cooled only with the second cooler, and a third mode where EGR is cooled with both coolers, wherein the controller selects a mode from the first, second, and third modes based on a first outlet temperature of the first EGR cooler and/or a second outlet temperature of the second EGR cooler relative to a fouling temperature, the first outlet temperature estimated downstream of the first EGR cooler and upstream of an outlet of the first EGR cooler bypass, and the second outlet temperature estimated downstream of the second EGR cooler and upstream of an outlet of the second EGR cooler bypass.

9. The system of claim 8 where the controller further adjusts the plurality of valve elements to adjust an amount and temperature of EGR delivered to the intake manifold, the valve elements further adjusted in response to the first outlet temperature of the first EGR cooler and the second outlet temperature of the second EGR cooler to adjust bypassing of the first and second EGR coolers differently based on whether any of said first and second outlet temperatures approaches the fouling temperature.

10. The system of claim 8 where the controller further operates the system in a fourth mode with where EGR is not cooled by either the first or second coolers.

11. The system of claim 9 where the controller transitions sequentially from the third mode to the first mode, and then to the second mode, and then the fourth mode to decrease cooling effect of the EGR coolers.

12. The system of claim 8 where the first and second EGR coolers have different cooling capacities, and where the controller selects the mode further based on the cooling capacities.

13. A method for delivering exhaust gas recirculation (EGR) through a recirculation system to an engine intake manifold, the recirculation comprising a first EGR cooler, a first EGR cooler bypass that bypasses the first EGR cooler, a second EGR cooler, and a plurality of valve elements, the method comprising, adjusting the plurality of valve elements to operate the recirculation system in a first mode where EGR is cooled only with the first EGR cooler, a second mode where EGR is cooled only with the second EGR cooler, and a third mode where EGR is cooled with both EGR coolers, wherein a mode is selected from the first, second, and third modes based on a first outlet temperature of the first EGR cooler and/or a second outlet temperature of the second EGR cooler relative to a fouling temperature, the first outlet temperature estimated downstream of the first EGR cooler and upstream of an outlet of the first EGR cooler bypass, and the second outlet temperature estimated downstream of the second EGR cooler and upstream of an outlet of the second EGR cooler bypass.

14. The method of claim 13 wherein the plurality of valve elements are further adjusted to operate the recirculation system in a fourth mode where EGR is not cooled by either the first or second coolers.

15. The method of claim 14, wherein the recirculation system further comprises a second EGR cooler bypass that bypasses the second EGR cooler, the first EGR cooler coupled in parallel with the second EGR cooler, the method further comprising, adjusting the plurality of valve elements to adjust an amount and temperature of EGR delivered to the intake manifold.

16. The method of claim 14 wherein the first and second EGR coolers have different cooling capacities, and wherein the mode is further selected based on the cooling capacities.

17. The method of claim 14 wherein the first and second EGR coolers have different cooling temperatures, and wherein the mode is further selected based on the cooling temperatures.

18. The method of claim 13 wherein the mode is further selected based on an intake manifold temperature.

* * * * *